No. 648,240. Patented Apr. 24, 1900.
J. A. COLLET & E. E. MEARS.
CUSHION TIRE FOR VEHICLE WHEELS.
(Application filed Aug. 24, 1899.)
(No Model.) 2 Sheets—Sheet 1.
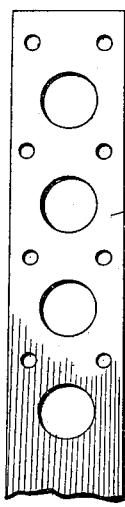
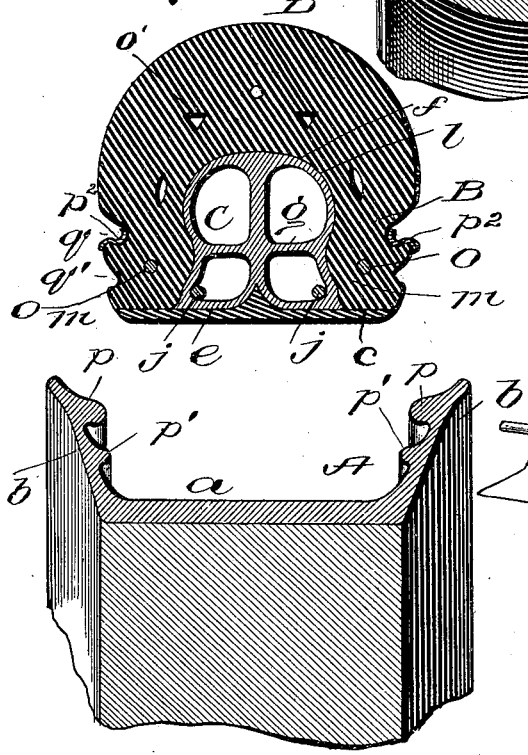
Witnesses
Jules A. Collet,
Elmer E. Mears, Inventors.
by R. S. & A. B. Lacey Their Attorneys No. 648,240.  
Patented Apr. 24, 1900.
J. A. COLLET & E. E. MEARS.
CUSHION TIRE FOR VEHICLE WHEELS.
(Application filed Aug. 24, 1899.)
(No Model.)  
2 Sheets—Sheet 2.
Fig. 4.
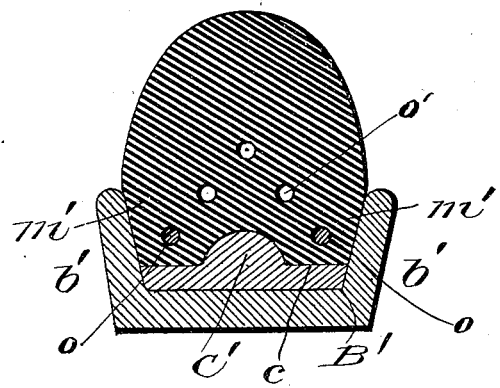
Fig. 5.
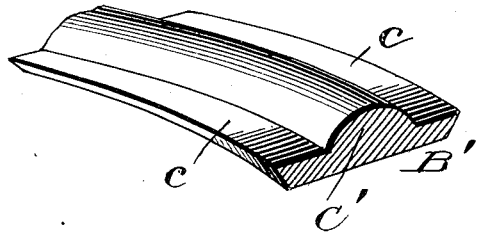
Fig 10.
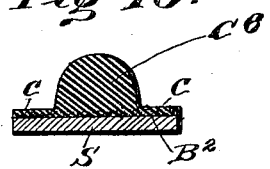
Fig. 7.
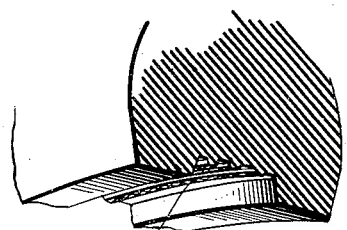
Fig. 6.
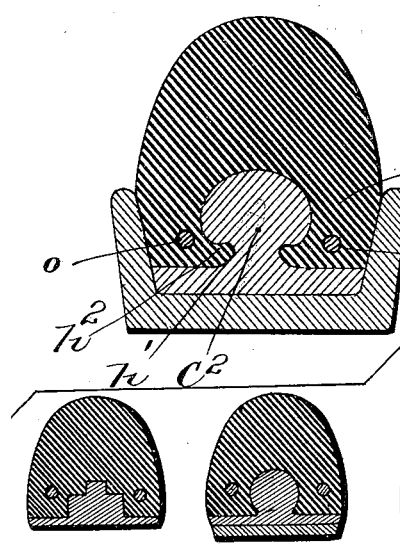
Fig. 11.
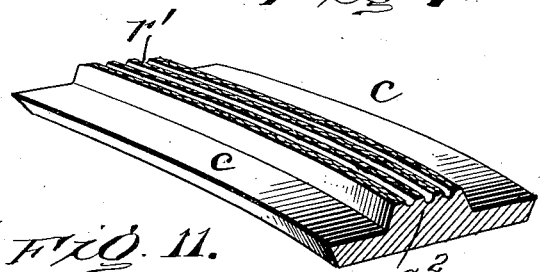
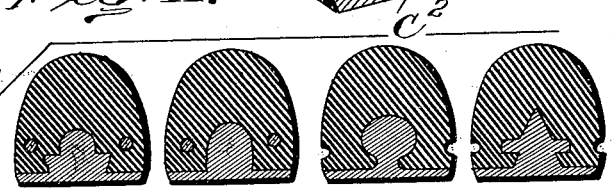
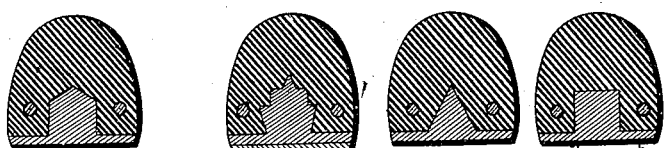
Witnesses  
Inventors:  
Jules A. Collet,  
Elmer E. Mears,  
R. Van Lacey  
Their Attorneys.
THE NORRIS PETERS CO., PHOTO-LITHO., WASHINGTON, D. C.

UNITED STATES PATENT OFFICE.

JULES A. COLLET AND ELMER E. MEARS, OF NEW YORK, N. Y.

CUSHION-TIRE FOR VEHICLE-WHEELS.

SPECIFICATION forming part of Letters Patent No. 648,240, dated April 24, 1900.

Application filed August 24, 1899. Serial No. 728,336. (No model.)

*To all whom it may concern:*

Be it known that we, JULES A. COLLET and ELMER E. MEARS, citizens of the United States, residing at New York, (Brooklyn,) in the county of Kings and State of New York, have invented certain new and useful Improvements in Cushion-Tires for Vehicle-Wheels; and we do hereby declare the following to be a full, clear, and exact description of the invention, such as will enable others skilled in the art to which it appertains to make and use the same.

This invention relates to improvements in cushion-tires for vehicle-wheels, the object being to provide a simple and efficient construction of tire designed to afford a maximum amount of service and to be replaced at a minimum cost and adapted to be held securely to the rim against accidental displacement.

The invention consists of certain novel features of construction, combination, and arrangement of parts, as will be hereinafter more fully described, and particularly pointed out in the appended claims.

In the accompanying drawings, forming a part of this specification, and in which like letters of reference designate corresponding parts throughout the several views, Figure 1 is a cross-sectional view of a tire constructed in accordance with our invention. Fig. 2 is a similar view showing the parts of the tire separated and in position to be assembled. Fig. 3 is a broken detail perspective view of a portion of the base-section and filler. Fig. 4 is a cross-sectional view of a modified form of tire. Fig. 5 is a fragmentary perspective view of the base-section. Fig. 6 is a view similar to Figs. 1 and 4, showing a further modification. Fig. 7 is a fragmentary top perspective view of the base and filler and bottom perspective view of the tread of the tire, showing a still further modification. Fig. 8 is a cross-sectional view showing a modification in which bands or tapes are used in place of the wires to secure the tire. Fig. 9 is a detail plan view of one of the perforated bands or tapes. Fig. 10 is a cross-sectional view showing a modified form of base-section. Fig. 11 shows a number of different forms of tires and fillers which may be employed.

Referring now more particularly to Figs. 1 to 3, inclusive, of the drawings, A represents the rim of the tire, which may be mounted upon the felly of the wheel in any approved manner; B, the base-section of the tire, seated in the rim; C, a filler secured to the base-section, and D the tread-section of the tire.

The rim A is of the channeled type and is formed with a flat outer face or seat $a$, constituting the bottom of the channel, and side flanges $b$, said side flanges being initially formed to extend outward at approximately an oblique angle to said seat, as shown in Fig. 2, so that they may be upset or pressed inward while cold to a position at right angles to the seat to confine and hold the tire in the channel against displacement in the manner more fully hereinafter described.

The base-section B of the tire is seated within the rim and carries the filler C and consists of a continuous strip of elastic or semi-elastic material—such as rubber, rubber and canvas and ducking, or felt—stretched to hug the seat $a$ tightly and secured thereto in any suitable manner, but preferably by cementing. The inner and outer sides of this strip are flat or straight and parallel, and the filler C extends medially around the outer side thereof, so as to leave longitudinal marginal portions $c$ exposed to form seats for the wings of the channeled tire. The filler as constructed in this form is made independently of the base-section and of greater depth than the channel in order to secure the greatest amount of cushioning or reinforcing effect accordingly as it is desired to employ it as a cushion to promote the resilient action of the tread-section or as a stay to reinforce the tread-section. When employed as a cushion, the filler may be made of rubber of greater yielding qualities than the tread-section and when employed as a reinforce of any suitable semi-elastic or inelastic material—such as wood, metal, or vulcanized rubber—of less yielding qualities than the tread-section. It is preferable when metal is used to make the filler in sections or segments suitably connected together and to apply a coating of rubber to the outer surface thereof by cementation or vulcanization to avoid slipping of the tire thereon. In this embodiment of the invention the filler is also preferably made hollow or tubular, as shown, and with a flat or substantially-flat base or inner periphery $e$ to seat squarely against the tread-section and with a convex or rounded head or outer periphery $f$ to afford a firm bearing to prevent lateral sliding or rocking movement of the tread thereon. If desired, the filler may be strengthened to resist strain by internal braces $g$ and have its side walls grooved or indented to form seats or recesses $h$ to receive the wings of the tread, as hereinafter described. Screws $i$ or other suitable fastening devices, or cement when the filler is formed of rubber, may be employed to secure said filler to the base-section B, and such fastening devices may also engage the rim when it is found necessary or desirable to make a firm connection. Binding-wires $j$, extending around the internal circumference of the filler and employed alone or in conjunction with the fastening devices, may also be used to hold the filler firmly in place, and the base of the filler may furthermore be formed with a medial groove or recess to receive a rib $k$ upon the base-section to provide an interlocking connection, which assists in preventing independent lateral play of the filler.

The tread-section D of the tire may be of any desired shape in cross-sectional area; but the outer face or tread portion thereof is preferably made rounding or convex, while the inner face or base portion thereof is flat, as shown. This section is formed with a circumferential channel $l$, opening through the said inner face or base portion thereof and of such depth and shape as to snugly receive the filler C when the tread-section is applied to the rim, as shown in Fig. 1. This channel bifurcates the base of the tread and separates the sides thereof to form wings $m$, the flat faces whereof bear against the marginal portions $c$ of the base-section, which serve as seats therefor. The solid part of the tread-section is preferably formed with longitudinal holes or openings for the reception of binding-wires $o$, drawn tightly and suitably secured at their ends to hold said tread-section firmly connected to the rim and seated in the channel. As an additional means of securing the tread-section within the rim the compressible side flanges $b$ of the rim may be provided with an inwardly-projecting outer series of hooks $p$ and inner series of lugs $p'$ to engage corresponding seats or recesses $q$ and $q'$ in the outer faces of the wings $m$. Ribs may be employed in place of the lugs, if desired, and a wear or stiffening plate or wire $p^2$ may be applied within each seat or recess $q$ to prevent tearing or displacement of the sides of the tire when strain falls thereon, as when the wheel is turned or the tire strikes an obstruction.

In applying the tire to the rim the base-section B, having the filler C attached thereto, is first stretched around and secured to the face $a$ of the rim, the tread-section D then forced into the rim and over the filler, the binding-wires $o$ tightened, and the sides $b$ of the rim finally upset or forced inward to compress the wings $m$ and bring the hook and lugs into engagement with their seats in said wings. The action of the binding-wires on being tightened is to draw the tread inward, whereby the inner faces of the side wings are brought into close frictional engagement with their seats $c$ and said wings also forced over the sides of the filler and caused to project into the recesses $h$ thereof. By this means outward displacement and creeping of the tread around the rim are effectually prevented. The side flanges $b$ of the rim when forced inward also serve to compress the wings of the tread and maintain them in engagement with the grooves $h$, while the hooks and lugs coact with said grooves to assist the binding-wires in preventing outward displacement of the tread. The hooks and lugs may, however, be dispensed with, and the side flanges of the rim need not be made compressible, as the binding-wires form a sufficiently strong and durable fastening to prevent displacement of the tread under all ordinary conditions in service. Longitudinal openings $o'$ may be formed in the tread-section to increase its elasticity.

It will be readily understood from the foregoing description that the filler acts in addition to the seats of the base-section as a restrainer in frictional contact with the tread to prevent creeping of the tread and that it also stays and reinforces the tread to prevent lateral movement thereof. It is furthermore adapted, as before stated, for use as a cushion to increase the resiliency of the tread or as a reinforce to strengthen the connection and promote the wearing qualities of the tread. The filler and base-section also occupy a large portion of the channel of the rim, which is usually completely filled by the tread itself, thus materially reducing the cost of manufacturing the tread and re-tiring a wheel. The base-section and tire when once applied form permanent fixtures of the rim and need not be removed, as no wear falls thereon, except in case of accidental injury, thus rendering it necessary to replace only the tread when worn so as to be unfit for further use, which, being channeled and of less depth than the rim, is comparatively inexpensive of manufacture, owing to the relatively-small amount of material going to make up the same. It will therefore be seen that our invention is productive of great advantages over the ordinary construction of tire of this character.

It is essential in all cases that the filler be medially disposed and the contacting faces of the rim and tire be made parallel to each other in order to secure an effective binding action and prevent creeping of the tire.

In the modified construction of tire shown in Figs. 4 and 5 the side flanges $b'$ of the tire, the side edges of the base-section, and the outer faces of the side wings $m'$ of the tread-section are made flaring to secure a wedging action when the parts are connected. The side flanges $b'$ also extend outward at an angle greater than a right angle to the bottom of the channel, but are not pressed inward, as in the construction shown in Figs. 1 and 3, to secure the tread. The filler $C'$ in this case is also formed integrally with the yielding base-section $B'$ and made of less depth than the rim-channel; but otherwise the construction is essentially the same.

In the modification shown in Fig. 6 the construction is substantially the same as shown in Figs. 4 and 5, except that the filler $C^2$ is made deeper and undercut to form grooves $h'$ to receive locking-flanges $h^2$, formed upon the inner sides of the wings $m$.

In the modification shown in Fig. 7 the construction is also substantially the same as shown in Figs. 4 and 5, the meeting faces $r$ and $r'$ of the channel of the tread and filler being, however, flattened and corrugated to effect a positive interlocking or frictional engagement to absolutely prevent any tendency of the tread to creep.

In Fig. 8 perforated bands, tapes, or plates $o^3$, made of woven fabric or metal, are employed in place of the binding-wires $o$ shown in the other figures. These bands, tapes, or plates may be imperforate, however, and they may be loosely fitted in openings or vulcanized to the tire and have their meeting ends connected in any suitable manner. It is obvious also that a single band or plate extending entirely across the tread may be employed in lieu of two plates. The form of band, tape, or plate preferably employed is shown in Fig. 9; but the perforations may be omitted, if desired, or made of any preferred size and shape.

If desired, the base-section may be provided with a backing or stiffening band, tape, or plate vulcanized or otherwise secured thereto. Fig. 10 shows a base-section $B^2$, having a backing $s$ of this character. The backing may be perforate or imperforate and secured to the under side or embedded in the part.

It will of course be understood that changes in the form, proportion, and minor details of construction of the several parts may be made within the scope of the invention without departing from the spirit or sacrificing any of the advantages thereof.

Having thus described the invention, what is claimed as new is—

1. A cushion-tire comprising a base-section, a filler extending medially of the base-section so as to leave flanges or marginal portions at opposite sides thereof forming seats, and a tread-section having a channel to receive said filler and side wings provided with abutting faces to bear upon said seats.

2. A cushion-tire comprising a base-section, an independent tubular filler having internal braces connecting the walls thereof and extending medially of and secured to said base-section so as to leave flanges or marginal portions at opposite sides thereof forming seats, and a tread-section having a channel to receive said filler and side wings provided with abutting faces to bear upon said seats.

3. In a cushion-tire, the combination with a channeled rim, of a tire comprising a base-section consisting of an elastic strip secured to and extending around the face of the rim, a filler secured to the outer surface of the base-section and extending medially around the same so as to leave flanges or marginal portions at opposite sides thereof forming seats, a tread-section seated in the rim-channel and having a channel receiving said filler and side wings provided with abutting faces bearing upon said seats, and means for securing the tread-section within the rim so that it may be removed independent of the base-section and filler.

4. In a cushion-tire, the combination, with a channeled rim, of a tire comprising a base-section consisting of an elastic strip secured to and extending around the face of the rim, a tubular filler extending medially around the base-section so as to leave flanges or marginal portions at opposite sides thereof forming seats and provided with internal braces connecting the sides thereof, means for connecting the filler to said base-section, a tread-section seated in the rim and having a channel receiving said filler and side wings formed with abutting faces bearing upon said seats, and means for securing said tread-section so that it may be removed independently of the base-section and filler.

5. In a cushion-tire, the combination of a channeled rim having side flanges provided with locking projections and initially formed to extend outward at a greater angle than a right angle to the base of the rim and adapted to be pressed inward to a substantially-right-angular position to confine the tire within said rim, a base-section secured to the base of the rim and carrying a filler arranged medially thereof, a tread-section having a central channel to receive the filler, side wings to bear upon said base-section and grooves or recesses to receive said locking projections on the flanges of the rim, whereby when said side flanges are pressed inward the wings will be confined and compressed between the filler and flanges, and stiffening plates or strips arranged within said grooves or recesses against which said locking projections directly bear.

In testimony whereof we affix our signatures in presence of two witnesses.

JULES A. COLLET. [L. S.]
ELMER E. MEARS. [L. S.]

Witnesses:
ROBT. B. DOBIE,
W. H. KUNCIE.